US012306658B1

(12) United States Patent
Zeng et al.

(10) Patent No.: US 12,306,658 B1
(45) Date of Patent: May 20, 2025

(54) ROCKER MECHANISM AND GAME CONTROLLER

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/616,669

(22) Filed: Mar. 26, 2024

(30) Foreign Application Priority Data

Jan. 19, 2024 (CN) ......................... 202420143614.4

(51) Int. Cl.
*G05G 5/05* (2006.01)
*G05G 9/047* (2006.01)

(52) U.S. Cl.
CPC ............... *G05G 5/05* (2013.01); *G05G 9/047* (2013.01); *G05G 2009/04725* (2013.01); *G05G 2009/04755* (2013.01)

(58) Field of Classification Search
CPC ........... G05G 2009/04725; G05G 2009/04755
See application file for complete search history.

(56) References Cited

U.S. PATENT DOCUMENTS 5,065,146 A * 11/1991 Garrett .................. G05G 9/047 250/221
2023/0324945 A1* 10/2023 Zeng ...................... G05G 9/047

* cited by examiner

*Primary Examiner* — Vicky A Johnson
(74) *Attorney, Agent, or Firm* — Westbridge IP LLC

(57) ABSTRACT

Disclosed are a rocker mechanism and a game controller, and the rocker mechanism includes a rocker assembly, an adjusting cover, an adjusting plate and an electronic control assembly. The rocker assembly includes a rocker base, a rocker body, a damping adjuster and a first spring. The adjusting cover is located outside the rocker base. The top surface of the adjusting plate is in contact with the surface of the rotating part, and the peripheral edge of the adjusting plate is threaded with the adjusting cover. The electronic control assembly is connected to the adjusting cover in a driving manner to drive the adjusting cover to rotate, so as to drive the adjusting plate to move closer to or away from the rocker body.

11 Claims, 7 Drawing Sheets

ROCKER MECHANISM AND GAME CONTROLLER

CROSS-REFERENCE TO RELATED APPLICATIONS

This application claims priority to Chinese Patent Application No. 202420143614.4, filed on Jan. 19, 2024, the entire contents of which are incorporated herein by reference.

TECHNICAL FIELD

The present application relates to the technical field of game controllers, and in particular to a rocker mechanism and a game controller.

BACKGROUND

Currently, mainstream game controllers on the market are equipped with rockers, buttons and triggers. The rocker can be tilted and rotated and is equipped with a spring to allow it to automatically return to the center. Game users input directional information to devices such as game consoles or computers by tilting and rotating the rocker to perform game operations.

The elastic force that causes the rocker of a game controller to automatically return to the center is called damping. Since different users have different preferences for damping, users need to adjust the damping of the rocker according to their own preferences. However, the current methods for adjusting damping on the market are relatively complicated, making it inconvenient for users to adjust by themselves.

SUMMARY

The main purpose of the present application is to provide a rocker mechanism, which aims to solve the problem of complicated damping adjustment of the rocker of the rocker mechanism of a game controller.

In order to achieve the above purpose, the present application provides a rocker mechanism, including:

- a rocker assembly, including a rocker base, a rocker body, a damping adjuster and a first spring; the rocker body is movably provided on the rocker base and is provided with a telescopic channel extending along a length direction of the rocker body; the damping adjuster includes a sliding part and a rotating part connected to the sliding part, and the sliding part can slide through the telescopic channel; the first spring is sleeved on the sliding part, and is provided between the rotating part and the rocker body;
- an adjusting cover, located outside the rocker base;
- an adjusting plate, movably connected to the rocker base; a top surface of the adjusting plate is in contact with a surface of the rotating part, and an outer peripheral edge of the adjusting plate is threaded to cooperate with threads of the adjusting cover; and
- an electronic control assembly, connected to the adjusting cover in a driving manner to drive the adjusting cover to rotate, so as to drive the adjusting plate to move closer to or away from the rocker body.

In an embodiment, the electronic control assembly includes a driving assembly and a transmission part provided on a peripheral surface of the adjusting cover, and the driving assembly is connected to the transmission part in a driving manner to drive the transmission part to rotate.

In an embodiment, the transmission part is configured as a first gear.

In an embodiment, the driving assembly includes a rotating motor and a second gear provided on an output shaft of the rotating motor, and transmission teeth of the first gear mesh with transmission teeth of the second gear.

In an embodiment, a diameter of the first gear is larger than a diameter of the second gear.

In an embodiment, the driving assembly includes a rotating motor and a worm provided on an output shaft of the rotating motor, and transmission teeth of the first gear mesh with transmission teeth of the worm; or the driving assembly includes a linear motor and a rack provided on an output shaft of the linear motor, and the transmission teeth of the rack mesh with the transmission teeth of the first gear.

In an embodiment, the transmission part and the adjusting cover are integrally formed.

In an embodiment, the rocker base includes a rocker shell, the rocker body is movably installed in the rocker shell, and a wall of the rocker shell is provided in a plurality of avoidance channels; the adjusting plate includes a sustaining part, a threaded part provided outside the sustaining part, and a plurality of penetration parts connecting the sustaining part and the threaded part; one penetration part is provided corresponding to one of the avoidance channels, and the penetration part is movably penetrated in the avoidance channel; the sustaining part is provided in the rocker shell, and a top surface of the sustaining part is in connect with a surface of the rotating portion; and the threaded part is threaded to cooperate with the threads of the adjusting cover.

In an embodiment, the rocker base includes an upper rocker arm, a lower rocker arm, a first magnet, a second magnet, a pressing base, a circuit board, a metal dome and a Hall integrated circuit, the upper rocker arm and the lower rocker arm are respectively rotatably installed in the shell and cover each other to form a rotation space inside, and a part of the rocker body is limited to the rotation space; the first magnet is installed on the upper rocker arm, the second magnet is installed on the lower rocker arm, and the pressing base is connected to the lower arm; the circuit board is provided below the pressing base, and the metal dome and the Hall integrated circuit are installed on the circuit board.

The present application further provides a game controller, including a controller shell and the above-mentioned rocker mechanism, the rocker mechanism is installed inside the controller shell.

The above-mentioned rocker mechanism at least includes the following beneficial effects.

The technical solution of the present application involves a rocker assembly, an adjusting cover, an adjusting plate, and an electronic control assembly. When adjusting the damping of the rocker mechanism, the electronic control assembly controls the rotation of the adjusting cover to drive the adjusting plate to move towards or away from the rocker body, thereby driving the rotating part of the damping adjuster to move closer to or away from the rocker body. The goal is to adjust the distance between the rotating part of the damping adjuster and the rocker body, achieving the purpose of adjusting the damping of the rocker body in the rocker mechanism. This solution allows for the direct rotation of the adjusting cover by the electronic control assembly to achieve the adjustment of the damping of the rocker body in the rocker mechanism. There is no need to disassemble the decorative shell of the outer layer of the rocker mechanism, functional parts that hinder the damping adjuster, and other parts that interfere with the user's adjustment of the position of the damping adjuster. In this way, the user can save the tedious steps of disassembling parts and manually adjusting the distance between the rotating part of the damping adjuster and the rocker body, so as to quickly adjust the damping of the rocker mechanism. It can be seen that the damping adjustment steps of the rocker body in the rocker mechanism of the technical solution of the present application are simple, and the damping of the rocker body of the rocker mechanism can be quickly adjusted, thereby increasing the user's sense of comfort.

BRIEF DESCRIPTION OF THE DRAWINGS

In order to more clearly illustrate the technical solution in the embodiments of the present application or in the related art, the accompanying drawings used in the embodiments or the related art will be briefly described below. Obviously, the accompanying drawings in the following description are only some embodiments of the present application. For those skilled in the art, other drawings can be obtained according to the structures shown in these drawings without creative efforts.

Figure 1:
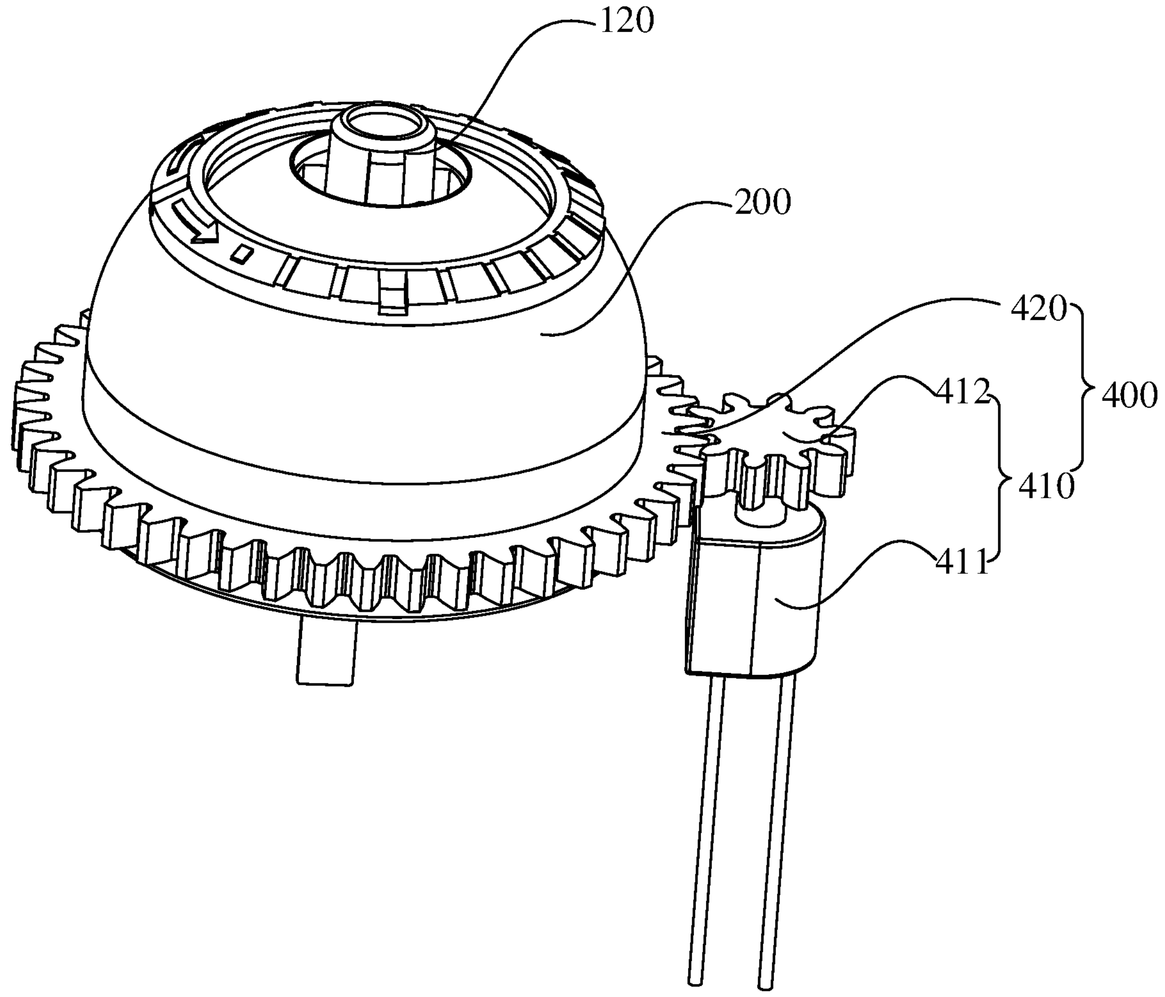
FIG. 1 is a schematic structural diagram of a rocker mechanism according to an embodiment of the present application.

The realization of the purpose, functional characteristics, and advantages of the present application will be further described in conjunction with the embodiments and with reference to the accompanying drawings.

DETAILED DESCRIPTION OF THE EMBODIMENTS

The technical solutions in the embodiments of the present application will be described clearly and completely below with reference to the accompanying drawings in the embodiments of the present application. It is obvious that the described embodiments are only some rather than all of the embodiments of the present application. All other embodiments obtained by those skilled in the art based on the embodiments of the present application without creative efforts shall fall within the scope of the present application.

It should be noted that all the directional indications (such as up, down, left, right, front, rear . . . ) in the embodiments of the present application are only used to explain the relative positional relationship, movement, etc. of the components in a certain posture (as shown in the drawings). If the specific posture changes, the directional indication will change accordingly.

In the present application, unless otherwise expressly stipulated and limited, the terms "connection" and "fixation" should be understood in a broad sense. For example, "connection" can be a fixed connection, a detachable connection, or an integral body; it can be a mechanical connection or an electrical connection; it can be a direct connection or an indirect connection through an intermediate medium; it can be an internal connection between two elements or an interactive relationship between two elements, unless otherwise clearly limited. For those skilled in the art, the specific meanings of the above terms in the present application can be understood according to specific circumstances.

It should be noted that, it there are descriptions such as "first" and "second" in the embodiments of the present application, the descriptions such as "first" and "second" are merely for descriptive purposes, and cannot be understood as indicating or implying relative importance or implicitly indicating the number of the indicated technical features. Therefore, the feature defined with "first" or "second" can explicitly or implicitly include at least one such feature. In addition, the meaning of "and/or" in the entire text is to include three parallel solutions, taking "A and/or B" as an example, including A solution, or B solution, or solutions that both A and B meet. In addition, the technical solutions between the various embodiments can be combined with each other, but the combination must be based on the realization of those skilled in the art. When the combination of technical solutions is contradictory or cannot be achieved, it should be considered that such combination of technical solutions does not exist, and is not within the scope of the present application.

The present application provides a rocker mechanism.

Figure 2:
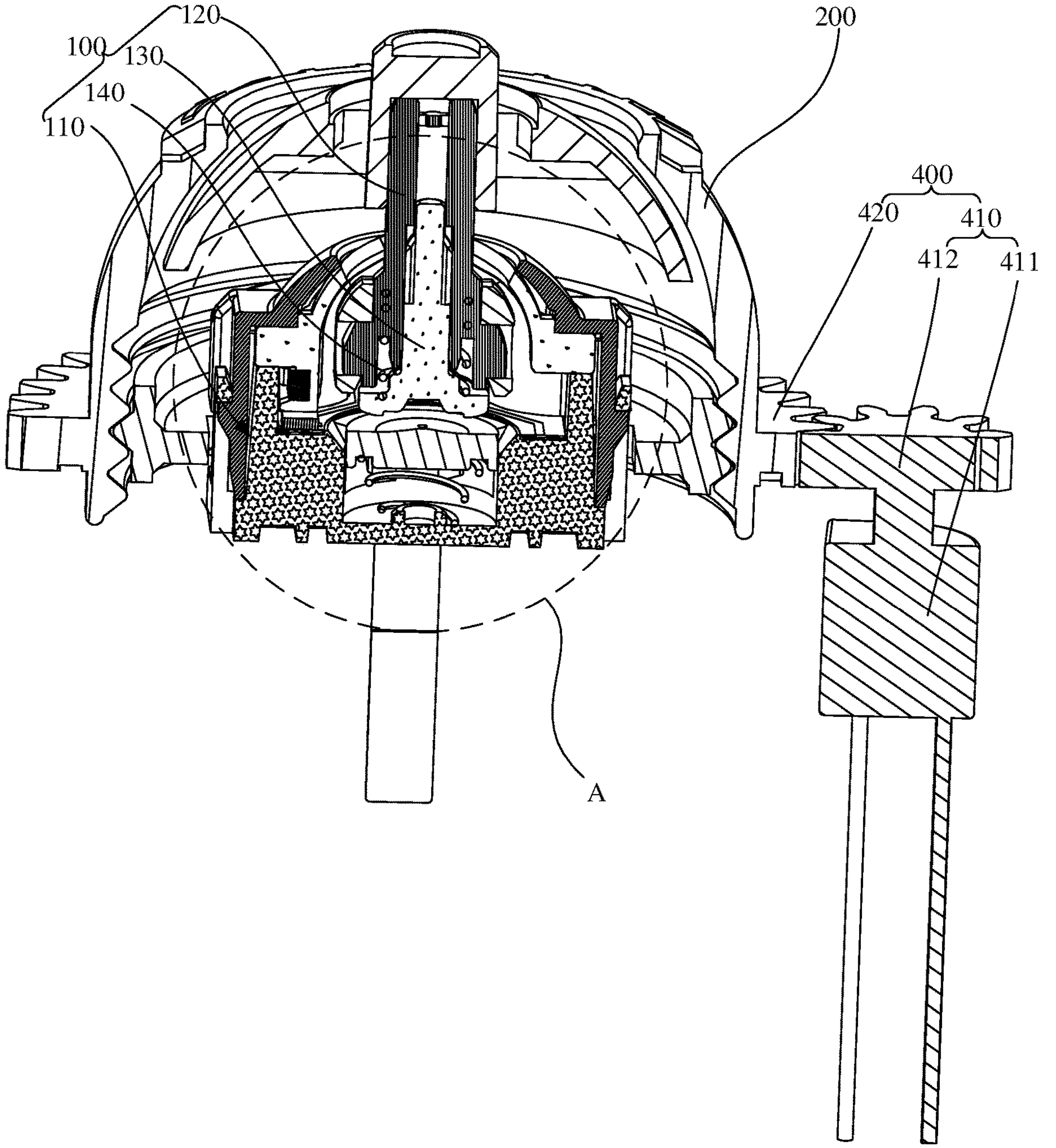
FIG. 2 is a schematic cross-sectional structural diagram of the rocker mechanism of the present application.
Figure 3:
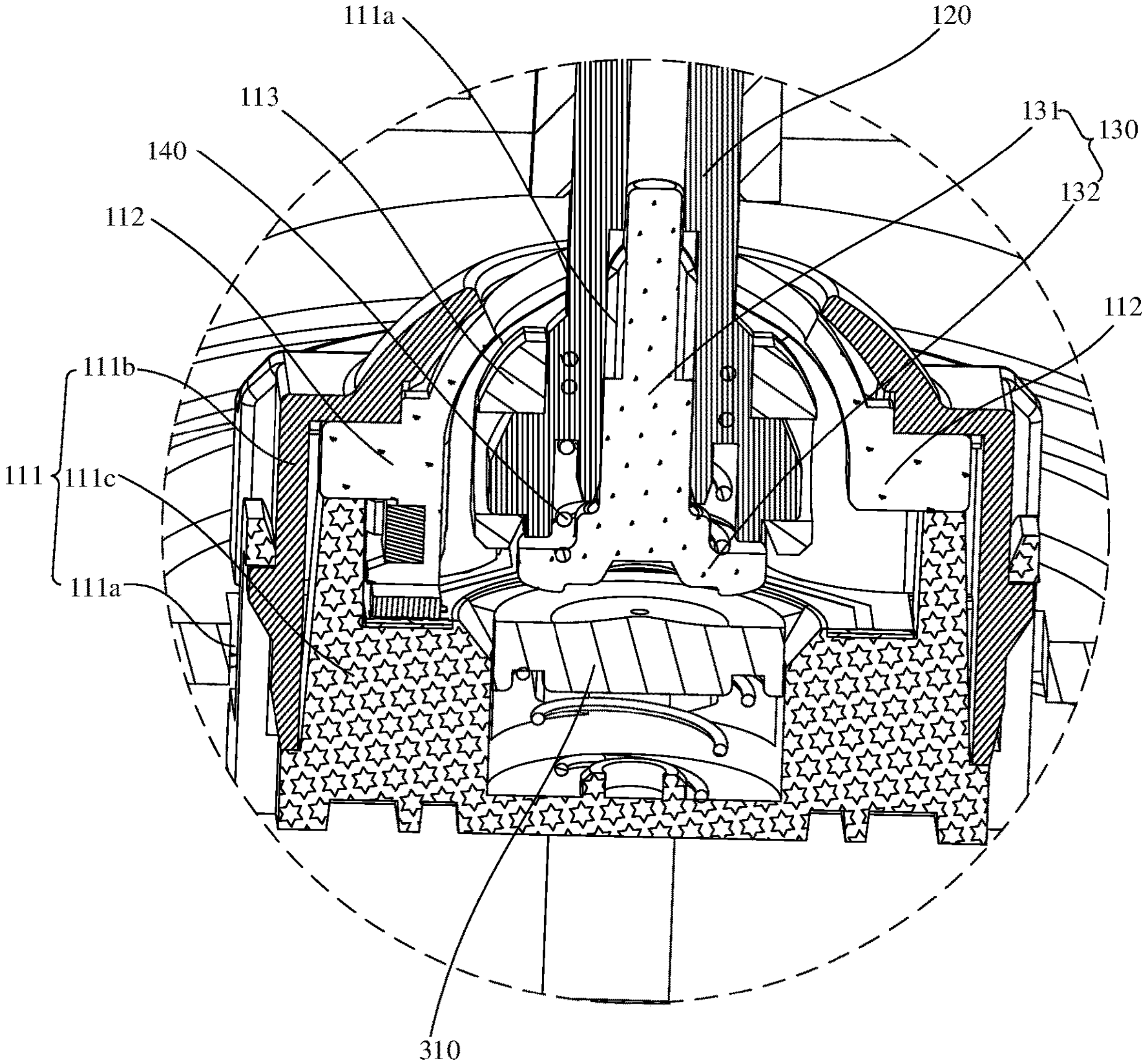
FIG. 3 is a partial enlarged view of position A in FIG. 2.
Figure 4:
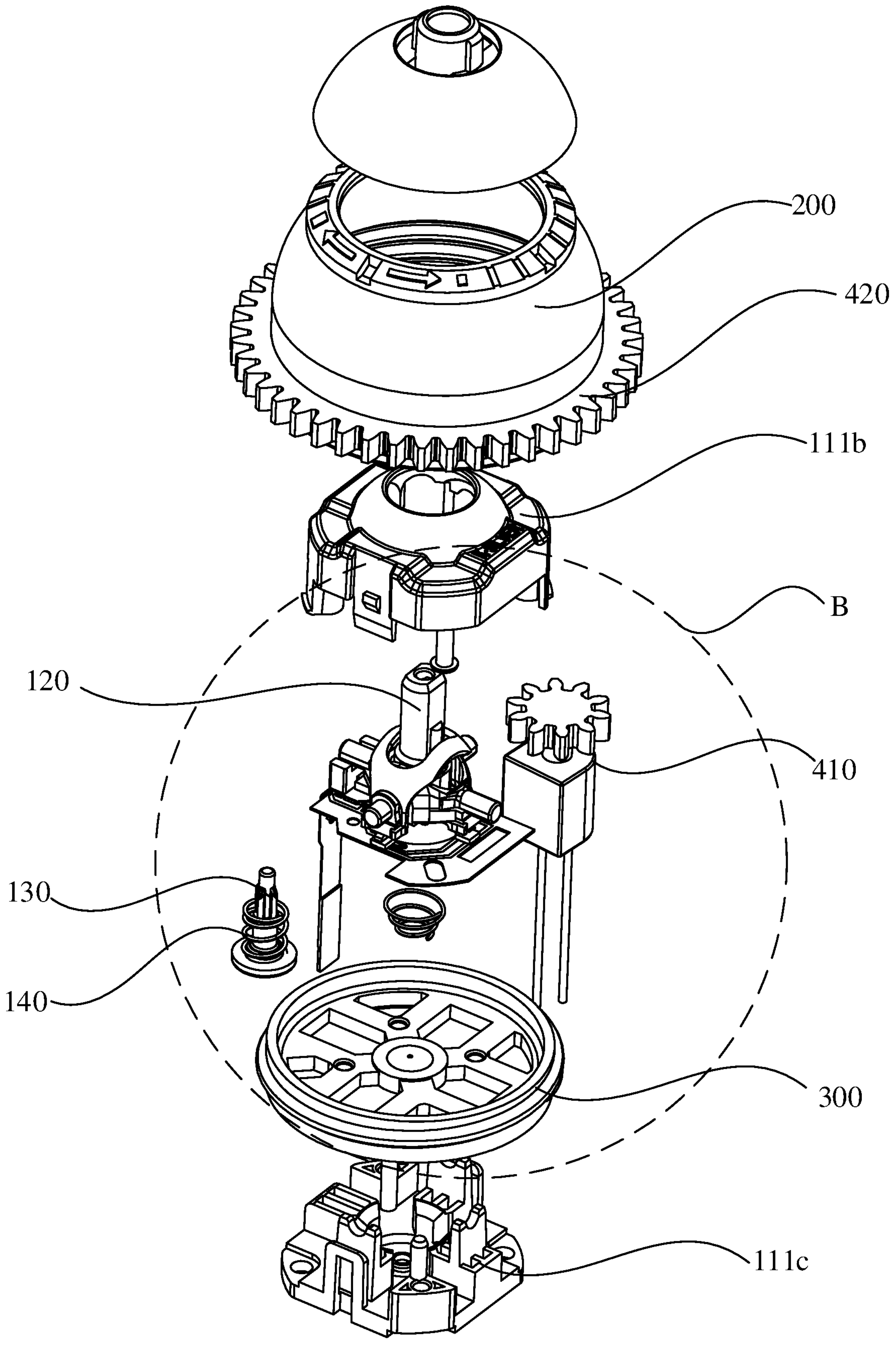
FIG. 4 is an exploded schematic structural diagram of the rocker mechanism of the present application.
Figure 5:
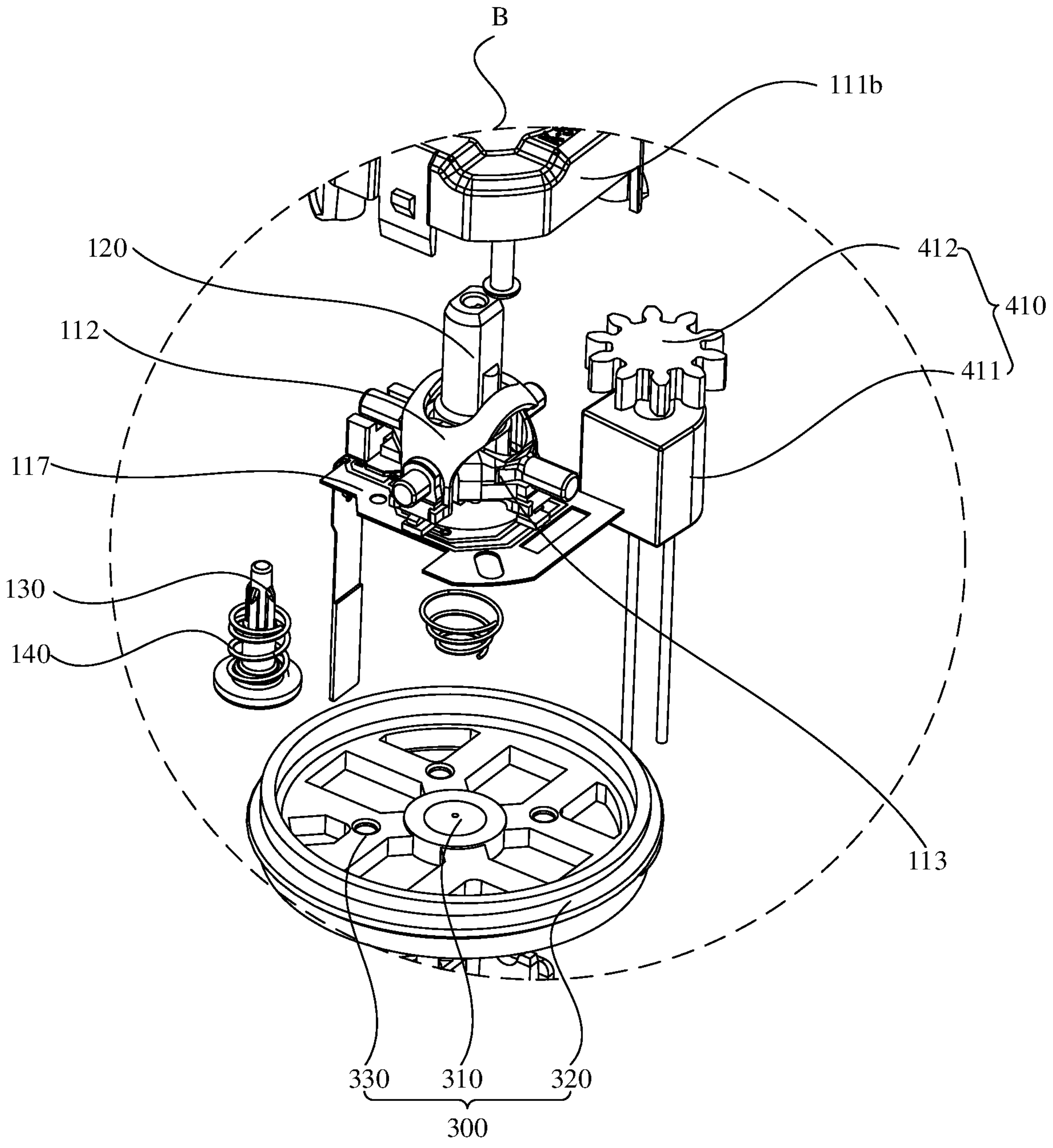
FIG. 5 is a partial enlarged view of position B in FIG. 4.
Figure 6:
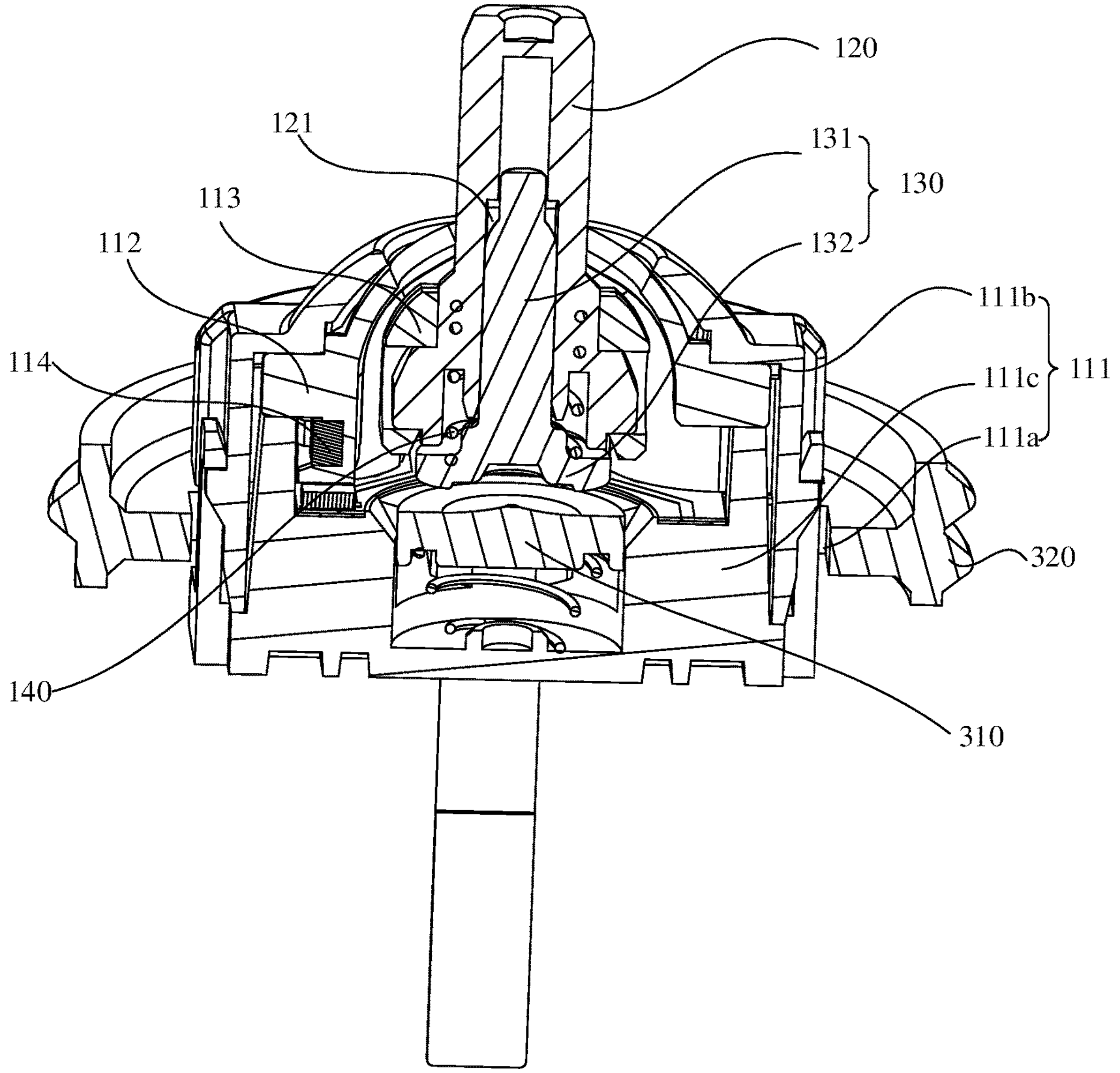
FIG. 6 is a schematic cross-sectional structural diagram of the rocker assembly and adjusting plate of the rocker mechanism according to the present application.
Figure 7:
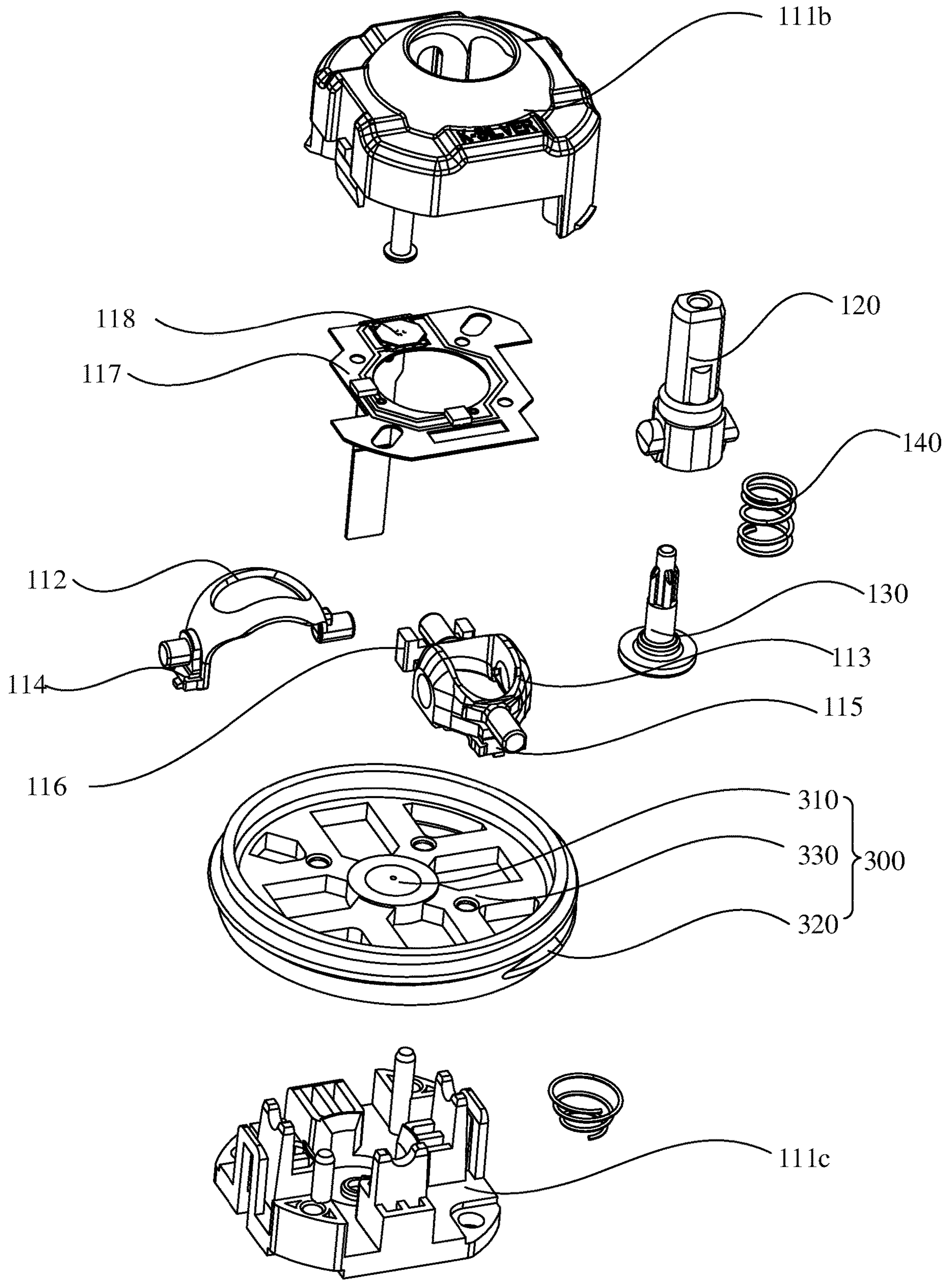
FIG. 7 is an exploded schematic structural diagram of the rocker assembly and adjusting plate of the rocker mechanism according to the present application.

Referring to FIG. 1 to FIG. 3, in one embodiment of the present application, the rocker mechanism includes a rocker assembly 100, an adjusting cover 200, an adjusting plate 300 and an electronic control assembly 400. The rocker assembly 100 includes a rocker base 110, a rocker body 120, a damping adjuster 130 and a first spring 140. The rocker body 120 is movably mounted on the rocker base 110 and is provided with a telescopic channel 121 extending along a length direction of the rocker body 120. The damping adjuster 130 includes a sliding part 131 and a rotating part 132 connected to the sliding part 131, and the sliding part 131 can slide through the telescopic channel 121. The first spring 140 is sleeved on the sliding part 131 and is provided between the rotating part 132 and the rocker body 120. The adjusting cover 200 is located outside the rocker base 110. The adjusting plate 300 is movably connected to the rocker base 110, the top in surface of the adjusting plate 300 is in contact with the surface of rotating part 132, and the peripheral edge of the adjusting plate 300 is threaded with the adjusting cover 200. The electronic control assembly 400 is connected to the adjusting cover 200 in a driving manner to drive the adjusting cover 200 to rotate, so as to drive the adjusting plate 300 to move closer to or away from the rocker body 120.

It can be understood, when the rocker body 120 is in the center position, the rotating part 132 of the damping adjuster 130 is closer to the rocker body 120. That is, the greater the initial compression of the first spring 140, the greater the force that the user needs to apply when turning and tilting the rocker body 120, and therefore the greater the damping. The farther the rotating part 132 of the damping adjuster 130 is from the rocker body 120, that is, the smaller the initial compression of the first spring 140, the smaller the force that the user needs to apply when turning and tilting the rocker body 120. In this embodiment, by controlling the electronic control assembly 400 to drive the rotation of the adjusting cover 200, the adjusting plate 300 is driven to move closer to or away from the rocker body 120, thereby driving the rotating part 132 of the damping adjuster 130 to move closer to or away from the rocker body, adjusting the distance between the rotating part 132 of the damping adjuster 130 and the rocker body 120, and achieving the purpose of adjusting the damping of the rocker body 120 in the rocker mechanism. This solution allows for the direct rotation of the adjusting cover 200 by the electronic control assembly 400 to achieve the adjustment of the damping of the rocker body 120 in the rocker mechanism. There is no need to disassemble the decorative shell of the outer layer of the rocker mechanism, functional parts that hinder the damping adjuster 130, and other parts that interfere with the user's adjustment of the position of the damping adjuster 130. In this way, the user can save the tedious steps of disassembling parts and manually adjusting the distance between the rotating part 132 of the damping adjuster 130 and the rocker body 120, so as to quickly adjust the damping of the rocker body 120 of the rocker mechanism. It can be seen that the damping adjustment steps of the rocker body 120 in the rocker mechanism of the technical solution of the present application are simple, and the damping of the rocker body 120 of the rocker mechanism can be quickly adjusted, thereby increasing the user's sense of comfort.

In this embodiment, the sliding part 131 of the damping adjuster 130 is a sliding rod. The sliding rod extends into the telescopic channel 121 and slides with the inner wall of the telescopic channel 121. When the user turns and tilts the rocker body 120, there is a certain contact area between the rotating part 132 of the damping adjuster 130 and the adjusting plate 300, causing the rotational fulcrum of the damping adjuster 130 and the rocker body 120 not located at the axis position shown in the figure. So the relative distance between the rotation part 132 of the damping adjuster 130 and the rocker body 120 becomes smaller. Therefore, the first spring 140, which is in contact with the rocker body 120 and the rotating part 132 of the damping adjuster 130, is compressed, causing the rocker body 120 to tend to return to center.

In one embodiment, an installation cavity is provided at one end of the rocker body 120 close to the rotating part 132 of the damping adjuster 130. The first spring 140 is sleeved on the sliding part 131 and is at least partially received in the installation cavity. Both ends of the first spring 140 are respectively in contact with the rotating part 132 of the damping adjuster 130 and the rocker body 120. In other embodiments, the rocker body 120 can be formed with a sliding rod, and the sliding part 131 of the damping adjuster 130 can be formed with a cavity that accommodates the sliding rod and is slidably matched with the sliding rod, thereby also achieving the effect of making the sliding part 131 and the rocker body 120 telescopically nested and slidingly matched.

In one embodiment, the electronic control assembly 400 includes a driving assembly 410 and a transmission part 420 provided on the peripheral surface of the adjusting cover 200, the driving assembly 410 is connected to the transmission part 420 in a driving manner to drive the transmission part 420 to rotate. This electronic control assembly 400 has a simple structure, making it not only easy to process but also easy to install, thereby saving production costs.

In one embodiment, the transmission part 420 is configured as a first gear. This is because the transmission accuracy of the gear is high, which can improve the accuracy of the electronic control assembly 400 in controlling the distance between the rotating part 132 of the damping adjuster 130 and the rocker body 120, thereby helping to improve the damping adjustment accuracy of the rocker body 120 of the rocker mechanism. Moreover, the gear works reliably and has a long life span, which can increase the life span of the electronic control assembly 400. Of course, the present application is not limited to this. In another embodiments, the transmission part 420 can also be configured as a transmission wheel, and the driving assembly 410 includes a motor, a driving wheel of an output shaft provided on the motor, and a transmission belt. The driving wheel drives the transmission wheel to rotate through the transmission belt, thereby driving the adjusting cover 200 to rotate.

In one embodiment, the driving assembly 410 includes a rotating motor 411 and a second gear 412 provided on an output shaft of the rotating motor 411, the transmission teeth of the first gear mesh with the transmission teeth of the second gear 412. Such a driving assembly 410 has high transmission accuracy, which can improve the accuracy of the electronic control assembly 400 in controlling the distance between the rotating part 132 of the damping adjuster 130 and the rocker body 120, thereby improving the damping adjustment accuracy of the rocker body 120 of the rocker mechanism.

It should be noted that the electronic control assembly 400 also includes a control key and a main control board, and the control key and the driving assembly 410 are electrically connected to the main control board respectively. When it needs to adjust the damping of the rocker body 120 of the rocker mechanism, the user can trigger the control key, and the control key sends information to the main control board. After receiving the information, the main control board sends a control command to the driving assembly 410. After receiving the command, the driving assembly 410 drives the adjusting cover 200 to rotate, thereby driving the adjusting plate 300 to extend the thread pattern of the adjusting cover 200 to move closer to or away from the rocker body 120. Then, the rotating part 132 of the damping adjuster 130 is pushed towards or away from the rocker body, thereby adjusting the distance between the rotating part 132 of the damping adjuster 130 and the rocker body 120, and finally realizing the damping adjustment of the rocker body 120 of the rocker mechanism.

The control button can be configured as a touch button or a physical button. There is no specific restriction on the structural form of the control button, as long as it can send commands from the user.

It can be understood that the driving assembly 410 is electrically connected to the main control board, which means that the driving part of the driving assembly 410 is electrically connected to the main control board. The driving part is the power source. For example, when the driving assembly 410 includes a rotating motor 411 and a second gear 412, the rotating motor 411 is electrically connected to the main control board, and when the driving assembly 410 includes a linear motor or a cylinder and a rack, the linear motor or cylinder is electrically connected to the main control board.

The diameter of the first gear is larger than the diameter of the second gear 412. It can be understood that the first gear is the large gear, and the second gear 412 is the small gear. Using the small gear to drive the large gear can help in deceleration, which is beneficial for fine-tuning. Moreover, providing a large gear and a small gear facilitates controlling the exchange ratio of the driving part's motion path through the diameter and number of teeth. Of course, the present application is not limited thereto. In other embodiments, the diameter of the first gear may also be equal to the diameter of the second gear 412.

In one embodiment, the driving assembly 410 includes a rotating motor 411 and a worm provided on an output shaft of the rotating motor 411, the transmission teeth of the first gear mesh with the transmission teeth of the worm. In another embodiment, the driving assembly 410 includes a linear motor and a rack provided on an output shaft of the linear motor, and the transmission teeth of the rack mesh with the transmission teeth of the first gear. The user can select the appropriate driving assembly 410 according to the spatial arrangement of the rocker assembly 100 or their hands. The electronic control assembly 400 only needs to be able to drive the adjusting cover 200 to rotate. The specific composition of the electronic control assembly 400 is not limited here.

In one embodiment, the transmission part 420 and the adjusting cover 200 are integrally formed, which can increase the connection strength between the transmission part 420 and the adjusting cover 200. Of course, the present application is not limited to this. In other embodiments, the transmission part 420 and the adjusting cover 200 can also be formed separately and then welded or bonded together.

Referring to FIG. 3 to FIG. 7, in one embodiment, the rocker base 110 also includes a rocker shell 111, the rocker body 120 is movably installed in the rocker shell 111, and the wall of the rocker shell 111 is provided in a plurality of avoidance channels 111*a*. The adjusting plate 300 includes a sustaining part 310, a threaded part 320 provided outside the sustaining part 310, and a plurality of penetration parts 330 connecting the sustaining part 310 and the threaded part 320. One penetration part 330 is provided corresponding to one of the avoidance channels 111*a*, and the penetration part 330 is movably penetrated in the avoidance channel 111*a*. The sustaining part 310 is provided in the rocker shell 111, and the top surface of the sustaining part 310 is in connect with the surface of the rotating portion 132. The threaded part 320 is threaded to cooperate with the threads of the adjusting cover 200. Such a structure can not only better protect the internal components of the rocker base 110 without interfering with the movement of the adjusting plate 300, but also increase the life span of the rocker assembly 100.

In one embodiment, the threaded part 320 is configured as an external thread provided on the peripheral surface of the adjusting plate 300, and an internal thread is formed on the inner wall of the adjusting cover 200 corresponding to the external thread of the adjusting plate 300. The external threads and internal threads cooperate, so that when the adjusting cover 200 rotates, the adjusting plate 300 can be driven to move towards or away from the rocker body 120 relative to the rocker shell 111 along the lines of the internal threads of the adjusting cover 200. This drives the rotating part 132 of the damping adjuster 130 closer to or away from the rocker body 120, so that when the rocker body 120 is in the center position, the initial compression amount of the first spring 140 changes, thereby adjusting the damping of the rocker body 120.

It can be understood, when the rocker body 120 is in the center position, the rotating part 132 of the damping adjuster 130 is closer to the rocker body 120. That is to say, the greater the initial compression of the first spring 140, the greater the force that the user needs to apply when turning and tilting the rocker body 120, and therefore the greater the damping. The farther the damping adjuster 130 is from the rocker body 120, that is, the smaller the initial compression of the first spring 140, the smaller the force that the user needs to apply when turning and tilting the rocker body 120, and therefore the smaller the damping. In this way, the player can adjust the damping of the rocker body 120 according to his own preference by controlling the electronic control assembly 400 to drive the adjusting cover 200. The steps for adjusting the damping of the rocker body 120 of such a rocker mechanism are simple, and the damping of the rocker body 120 of the rocker mechanism can be quickly adjusted.

Of course, in other embodiments, the inner wall of the adjusting cover 200 may be formed with a plurality of protrusions, and the adjusting plate 300 may be formed with a groove extending spirally along its outer circumference. The plurality of protrusions extend into the groove. The adjusting cover 200 is connected to the adjusting plate 300 through the matching of protrusions and grooves, which can also achieve the effect of driving the adjusting cover 200 to rotate through the electronic control assembly 400, thereby driving the damping adjuster 130 to move and adjusting the damping of the rocker body 120. Meanwhile, in other embodiments, the adjusting cover 200 may be formed with external threads on its outer wall, and the adjusting plate 300 may be formed with a cylindrical structure surrounding the outer wall of the adjusting cover 200. The inner wall of the cylindrical structure is formed with internal threads corresponding to the external threads. So that, the adjusting cover 200 can also be rotatably connected to the adjusting plate 300 through a threaded structure.

In this embodiment, the number of turns of the internal thread of the adjusting cover 200 is greater than the number of turns of the external thread of the adjusting plate 300, so as to achieve a larger adjustment range. Of course, the present application is not limited to this. The number of turns of the internal thread of the adjusting cover 200 and the number of turns of the external thread of the adjusting plate 300 can be adaptively adjusted according to actual adjustment requirements (such as thread pitch, adjustment range).

In this embodiment, although the rocker shell 111 includes an upper shell 111*b* and a lower shell 111*c*, the present application is not limited thereto. The rocker shell 111 can be integrally formed by injection molding. The rocker shell 111 can be made of plastic or metal, and is used to be fixed on an input device such as a game controller and provide fixation and support for other components of the rocker assembly 100.

In this embodiment, a plurality of limiting holes are also provided between the sustaining part 310 and the threaded part 320 of the adjusting plate 300. The upper shell 111*b* and the lower shell 111*c* of the rocker shell 111 are formed with a plurality of limiting columns corresponding to the limiting holes. The limiting column passes through the limiting hole to limit the rotation of the adjusting plate 300 relative to the rocker shell 111, so that the adjusting plate 300 can only move within the rocker shell 111.

In other embodiments, the rocker shell 111 can be formed with a limiting hole, and the adjusting plate 300 can be formed with a limiting column. In this case, the adjusting plate 300 can also be movably connected to the rocker shell 111.

In one embodiment, the rocker assembly 100 also includes a second spring. Two ends of the second spring respectively are in contact with the lower surface of the adjusting plate 300 and the bottom of the rocker shell 111, so as to support and balance the load of the adjusting plate 300, so that the electronic control assembly 400 can rotate the adjusting cover 200 more smoothly and has a better feel of usage.

In order to maintain better structural stability, in this embodiment, the second spring is a conical coil spring. Of course, the present application is not limited to this. In other embodiments, the rocker assembly 100 may not include the second spring, and its basic damping adjustment effect can still be achieved.

In one embodiment, the rocker base 110 includes an upper rocker arm 112, a lower rocker arm 113, a first magnet 114, a second magnet 115, a pressing base 116, a circuit board 117, a metal dome 118 and a Hall integrated circuit, the upper rocker arm 112 and the lower rocker arm 113 are respectively rotatably installed in the rocker shell 111 and cover each other to form a rotation space inside, and a part of the rocker body 120 is limited to the rotation space and can be tilted and rotated by the user. The first magnet 114 is installed on the upper rocker arm 112, the second magnet 115 is installed on the lower rocker arm 113, and the pressing base 116 is connected to the lower rocker arm 113. The circuit board 117 is provided below the pressing base 116, and the metal dome 118 and the Hall integrated circuit are installed on the circuit board 117. The pressing base 116 can be driven by the lower rocker arm 113 to press the metal dome 118 to achieve a click operation of the rocker. The first magnet 114 and the second magnet 115 are respectively coupled to the Hall integrated circuit on the circuit board 117, so as to convert the rotation information of the upper rocker arm 112 and the lower rocker arm 113 into electrical signals and output them through the circuit board 117. It is worth noting that detailed instructions on how to install and rotate the rocker assembly 100 and how to convert magnetic field changing information into electrical signals have been disclosed in detail in relevant patent documents, and it is also well known to those skilled in the art, so it will not be described here again.

In other embodiments, the rocker assembly 100 with a potentiometer can be used to replace the first magnet 114, the second magnet 115, the pressing base 116, the circuit board 117, the metal dome 118 and the Hall integrated circuit. In some special cases, the rocker assembly 100 may only include a rocker, an upper rocker arm 112 and a lower rocker arm 113. In this case, the rocker assembly 100 may not output an electrical signal but only for testers to debug the usage feeling of the rocker assembly 100. The above-mentioned situations are all included in the protection scope of the present application.

The present application further provides a game controller, including a controller shell and a rocker mechanism. The specific structure of the rocker mechanism refers to the above-mentioned embodiments. Since the game controller adopts all the technical solutions of the above embodiments, it has at least all the beneficial effects brought by the technical solutions of the above embodiments, which will not be described again here. The rocker mechanism is installed inside the controller shell.

The above are only some embodiments of the present application, and do not limit the scope of the present application. Under the concept of the present application, any equivalent structural transformations made by using the description and accompanying drawings of the present application, or direct/indirect application in other related technical fields, are included in the scope of the present application.

What is claimed is:

1. A rocker mechanism, comprising:

a rocker assembly, comprising a rocker base, a rocker body, a damping adjuster and a first spring, wherein the rocker body is movably provided on the rocker base and is provided with a telescopic channel extending along a length direction of the rocker body, the damping adjuster comprises a sliding part and a rotating part connected to the sliding part, the sliding part is configured to slide through the telescopic channel, and the first spring is sleeved on the sliding part and is provided between the rotating part and the rocker body;

an adjusting cover, located outside the rocker base;

an adjusting plate, movably connected to the rocker base, wherein a top surface of the adjusting plate is in contact with a surface of the rotating part, and a peripheral edge of the adjusting plate is threaded to cooperate with threads of the adjusting cover; and an electronic control assembly, connected to the adjusting cover in a driving manner to drive the adjusting cover to rotate, so as to drive the adjusting plate to move closer to or away from the rocker body.

2. The rocker mechanism of claim 1, wherein the electronic control assembly comprises a driving assembly and a transmission part provided on a peripheral surface of the adjusting cover, and the driving assembly is connected to the transmission part in a driving manner to drive the transmission part to rotate.

3. The rocker mechanism of claim 2, wherein the transmission part and the adjusting cover are integrally formed.

4. The rocker mechanism of claim 2, wherein the transmission part is configured as a first gear.

5. The rocker mechanism of claim 4, wherein the driving assembly comprises a rotating motor and a worm provided on an output shaft of the rotating motor, and transmission teeth of the first gear mesh with transmission teeth of the worm.

6. The rocker mechanism of claim 4, wherein the driving assembly comprises a linear motor and a rack provided on an output shaft of the linear motor, and transmission teeth of the rack mesh with transmission teeth of the first gear.

7. The rocker mechanism of claim 4, wherein the driving assembly comprises a rotating motor and a second gear provided on an output shaft of the rotating motor, and transmission teeth of the first gear mesh with transmission teeth of the second gear.

8. The rocker mechanism of claim 7, wherein a diameter of the first gear is larger than a diameter of the second gear.

9. The rocker mechanism of claim 1, wherein the rocker base comprises a rocker shell, the rocker body is movably installed in the rocker shell, and a wall of the rocker shell is provided in a plurality of avoidance channels; the adjusting plate comprises a sustaining part, a threaded part provided outside the sustaining part, and a plurality of penetration parts connecting the sustaining part and the threaded part; one penetration part is provided corresponding to one of the avoidance channels, and the penetration part is movably penetrated in the avoidance channel; the sustaining part is provided in the rocker shell, and a top surface of the sustaining part is in connect with a surface of the rotating portion; and the threaded part is threaded to cooperate with threads of the adjusting cover.

10. The rocker mechanism of claim 9, wherein the rocker base comprises an upper rocker arm, a lower rocker arm, a first magnet, a second magnet, a pressing base, a circuit board, a metal dome and a Hall integrated circuit, the upper rocker arm and the lower rocker arm are respectively rotatably installed in the rocker shell and cover each other to form a rotation space inside, and a part of the rocker body is limited to the rotation space; the first magnet is installed on the upper rocker arm, the second magnet is installed on the lower rocker arm, and the pressing base is connected to the lower rocker arm; and the circuit board is provided below the pressing base, and the metal dome and the Hall integrated circuit are installed on the circuit board.

11. A game controller, comprising:

a controller shell; and the rocker mechanism of claim 1, wherein the rocker mechanism is installed inside the controller shell.

* * * * *